(12) United States Patent
Rudyan (10) Patent No.: US 11,560,687 B2
(45) Date of Patent: *Jan. 24, 2023

(54) BELOW GRADE, BLIND SIDE, IMPROVED DUAL WATERPROOFING MEMBRANE ASSEMBLY INCORPORATING A BENTONITE SHEET WATERPROOFING MEMBRANE, AND A SHEET MEMBRANE WITH ADHESIVE TO FULLY BOND TO CONCRETE/SHOTCRETE, AND A METHOD OF MAKING, AND USING SAME

(71) Applicant: Amir Rudyan, Canoga Park, CA (US)

(72) Inventor: Amir Rudyan, Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,964

(22) Filed: Aug. 17, 2021

(65) Prior Publication Data

US 2021/0372073 A1    Dec. 2, 2021

Related U.S. Application Data

(63) Continuation-in-part of application No. 16/740,389, filed on Jan. 10, 2020, now Pat. No. 11,142,880.

(60) Provisional application No. 62/852,049, filed on May 23, 2019.

(51) Int. Cl.
| | |
|---|---|
| *E02D 31/02* | (2006.01) |
| *E04B 1/66* | (2006.01) |
| *B32B 9/04* | (2006.01) |
| *B32B 7/12* | (2006.01) |
| *B32B 5/02* | (2006.01) |
| *E04B 1/62* | (2006.01) |

(52) U.S. Cl.
CPC ............ *E02D 31/025* (2013.01); *B32B 5/024* (2013.01); *B32B 7/12* (2013.01); *B32B 9/045* (2013.01); *E02D 31/02* (2013.01); *E04B 1/625* (2013.01); *E04B 1/665* (2013.01); *B32B 2264/10* (2013.01); *B32B 2307/7246* (2013.01); *B32B 2307/7265* (2013.01); *B32B 2307/732* (2013.01)

(58) Field of Classification Search
CPC ......... E04B 1/665; E04B 1/625; E02D 31/02; E02D 31/06; E02D 31/025
See application file for complete search history.

(56) References Cited

U.S. PATENT DOCUMENTS

| | | |
|---|---|---|
| 3,445,322 A | 5/1969 | Saiia |
| 4,139,588 A | 2/1979 | Clem |
| 4,467,015 A | 8/1984 | Clem |

(Continued)

*Primary Examiner* — Jessie T Fonseca
(74) *Attorney, Agent, or Firm* — Aziz M. Ahsan; Ahsan & Associates, PLLC (57) ABSTRACT

The present invention relates to a below grade, blind side, improved dual waterproofing membrane assembly incorporating a secondary membrane comprising of a bentonite sheet waterproofing layer, and a primary membrane comprising of a sheet membrane having an adhesive to fully bond to a concrete/shotcrete. The invention encompasses a dual layer or dual membrane system that acts as a barrier, and prevents, and blocks water and moisture, from passing from one side of the structure to the other side. The dual barrier layer system can be used along a wall, a floor, a ceiling, or along any structure which requires water or moisture proofing. The invention can be used between a concrete or shotcrete layer and the surrounding earth, such as, along an area that has a high water table, or a constant hydrostatic pressure, or high ground moisture, that may creep into a foundation or a wall.

20 Claims, 6 Drawing Sheets

(56) References Cited

U.S. PATENT DOCUMENTS

| | | |
|---|---|---|
| 4,581,864 A | 4/1986 | Shvakhman |
| 4,733,989 A | 3/1988 | Harriett |
| 4,810,573 A | 3/1989 | Harriett |
| 4,943,185 A | 7/1990 | McGuckin |
| 7,698,858 B2 | 4/2010 | Schroer |
| 9,771,703 B1 | 9/2017 | Golding, Jr. |
| 2007/0180791 A1 | 8/2007 | Amster |
| 2008/0245007 A1 | 10/2008 | McDonald |
| 2018/0290427 A1 | 10/2018 | Humphreys |

BELOW GRADE, BLIND SIDE, IMPROVED DUAL WATERPROOFING MEMBRANE ASSEMBLY INCORPORATING A BENTONITE SHEET WATERPROOFING MEMBRANE, AND A SHEET MEMBRANE WITH ADHESIVE TO FULLY BOND TO CONCRETE/SHOTCRETE, AND A METHOD OF MAKING, AND USING SAME

CROSS-REFERENCE TO RELATED APPLICATIONS

The instant Patent Application is a Continuation-In-Part (CIP) of U.S. Non-Provisional patent application Ser. No. 16/740,389, filed on Jan. 10, 2020, titled "Below Grade, Blind Side, Dual Waterproofing Membrane Assembly Incorporating A Bentonite Sheet Waterproofing Membrane, And A Sheet Membrane With Adhesive To Fully Bond To Concrete/Shotcrete, And A Method Of Making, And Using Same", and which issued as U.S. Pat. No. 11,142,880, on Oct. 12, 2021, and which patent application claims priority to and the benefit of U.S. Provisional Patent Application Ser. No. 62/852,049, filed on May 23, 2019, titled "Below Grade, Blind Side, Dual Waterproofing Membrane Assembly Incorporating A Bentonite Sheet Waterproofing Membrane, and a Sheet Membrane With Adhesive To Fully Bond To Concrete/Shotcrete, And A Method Of Making, And Using Same," the entire disclosure of each application is incorporated herein by reference.

FIELD OF THE INVENTION

The present invention relates generally to a below grade, blind side, improved dual waterproofing membrane assembly incorporating at least one secondary membrane comprising of at least one bentonite sheet waterproofing layer, and at least one primary membrane comprising of at least one sheet membrane with at least one adhesive to fully bond to a concrete/shotcrete, and a method of making, and using same. More particularly, the invention encompasses a dual layer or dual membrane system that acts as a barrier, and prevents, and blocks water and moisture, from passing from one side of the structure to the other side. The innovative dual barrier layer system can be used along a wall, a floor, a ceiling, or along any structure which requires water or moisture proofing. The invention can be most effectively used between a concrete or shotcrete layer and the surrounding earth, such as, along an area that has a high water table, or a constant hydrostatic pressure, or high ground moisture, that may creep into a foundation or a wall. The inventive dual barrier waterproofing layer system can be used in any building or wall construction, and can be placed under or around a foundation of a building or dwelling or on its below grade blind side retaining walls, etc. It should be appreciated that the inventive waterproofing system comprises of two separate and independent waterproofing membranes or layers, and which are innovatively combined to create a single robust waterproofing layer or system.

BACKGROUND INFORMATION

Water or moisture penetration into a structure has have been known in the water proofing industry for many years, and the water proofing industry has addressed this well-known problem in a variety of ways, and which are well known to the people skilled in the art.

U.S. Pat. No. 4,139,588 (Arthur G. Clem) describes a panel which is provided forming a water barrier and comprising two opposing spaced sheets having between said spaced sheets a sealant composition comprising bentonite; a water soluble dispersing agent selected from the group consisting of a water-soluble salt of acetic acid, a water-soluble salt of phosphoric acid, and a water-soluble salt of boric acid; and a water-soluble polymer selected from the group consisting of polyacrylic acid, water-soluble salts of polyacrylic acid, hydrolyzed polyacrylonitrile, polyvinyl acetate, polyvinyl alcohol, copolymers of the foregoing, and a copolymer of acrylic acid and maleic anhydride, the amount of water-soluble polymer in said sealant composition being from 0.1% to 3.0%, by weight, and the amount of water-soluble dispersant in said sealant composition being from 0.1% to 3.0%, by weight, the weight ratio of water-soluble dispersant to water-soluble polymer being from 6:1-36. The panel is disposed against a foundation to act as a water barrier, shielding the foundation against water seepage.

U.S. Pat. No. 4,943,185 (James P. McGuckin, et al.) describes a combination drainage and waterproofing system for subterranean walls includes panels which have drain passages on the side thereof adjacent the soil. The front surface of each panel screens against soil entering the passages and the opposite surface of each panel is waterproof and is disposed in waterproof engagement with the waterproof surfaces of adjacent panels. A variety of panel constructions are disclosed. Several modes for providing the screening surfaces and the waterproof surfaces are also disclosed.

US Patent Publication No. 2007/0180791 (Daniel S. Amster) describes a draining apparatus and method for use in the construction of buildings having a stucco interior. The apparatus has a drain section and a screen coupled thereto. The drain section consists of a series of channels formed by a plurality of knobs, which in one embodiment may be formed into a plurality of aligned columns. The apparatus is coupled to a building foundation, at a level where it can facilitate positive drainage of water that has migrated downward through the stucco.

However, this invention improves on the deficiencies of the prior art and provides an inventive below grade, blind side, improved dual waterproofing membrane assembly incorporating at least one bentonite sheet waterproofing membrane, and at least one sheet membrane having at least one adhesive to fully bond to concrete/shotcrete, and a method of making, and using same.

PURPOSES AND SUMMARY OF THE INVENTION

The invention is a novel below grade, blind side, improved dual waterproofing membrane assembly incorporating at least one bentonite sheet waterproofing membrane, and at least one sheet membrane having at least one adhesive to fully bond to concrete/shotcrete, and a method of making, and using same.

Therefore, one purpose of this invention is to provide a novel below grade, blind side, improved dual waterproofing membrane assembly incorporating at least one secondary membrane comprising of at least one bentonite sheet waterproofing layer, and at least one primary membrane comprising of at least one sheet membrane with at least one adhesive to fully bond to a concrete/shotcrete, and a method of making, and using same Another purpose of this invention is to provide a dual layer system that acts as a barrier, and prevents, and blocks water and moisture, from passing from one side of a structure to the other side.

Yet another purpose of this invention is to provide an innovative dual barrier layer system that can be used fully or partially along a wall, a floor, a ceiling, or along any structure which requires water or moisture proofing.

Still yet another purpose of this invention is to provide at least one waterproof barrier layer for a concrete or shotcrete layer.

Therefore, in one aspect this invention comprises a dual waterproofing membrane assembly system for a structure, comprising:
(a) at least one soil retention system having a first face and a second face, and wherein said first face faces compacted earth or soil;
(b) at least one bentonite sheet waterproofing membrane layer having a first face and a second face, and wherein at least a portion of said first face of said at least one bentonite sheet waterproofing membrane layer is secured to at least a portion of said second face of said at least one soil retention system, and said at least one bentonite sheet waterproofing membrane layer is composed of a layer of a first material;
(c) at least one waterproof sheet membrane layer having a first face and a second face, said at least one waterproof sheet membrane layer is composed of a layer of a second material, and wherein said second face of said at least one waterproof sheet membrane layer has at least one layer of at least one adhesive, and wherein at least a portion of said first face of said at least one waterproof sheet membrane layer is secured to at least a portion of said second face of said at least one bentonite sheet waterproofing membrane layer, so as to form said dual waterproofing membrane assembly system for a structure;
(d) wherein said first material is different than said second material;
(e) wherein said at least one first waterproof membrane, and said at least one second waterproof membrane forming a dual waterproofing layer extends along at least a portion of a wall; and
(f) wherein one of said at least one first waterproof membrane, and said at least one second waterproof membrane extends along at least a portion of a floor.

In another aspect this invention comprises a method of providing a dual waterproofing membrane assembly system for a structure, comprising:
(a) at least one soil retention system having a first face and a second face, and wherein said first face faces compacted earth or soil;
(b) at least one bentonite sheet waterproofing membrane layer having a first face and a second face, and wherein at least a portion of said first face of said at least one bentonite sheet waterproofing membrane layer is secured to at least a portion of said second face of said at least one soil retention system, and said at least one bentonite sheet waterproofing membrane layer is composed of a layer of a first material;
(c) at least one waterproof sheet membrane layer having a first face and a second face, said at least one waterproof sheet membrane layer is composed of a layer of a second material, and wherein said second face of said at least one waterproof sheet membrane layer has at least one layer of at least one adhesive, and wherein at least a portion of said first face of said at least one waterproof sheet membrane layer is secured to at least a portion of said second face of said at least one bentonite sheet waterproofing membrane layer;
(d) at least one layer of concrete or shotcrete having a first face and a second face, and wherein at least a portion of said first face of said at least one layer of concrete or shotcrete is secured to at least a portion of said at least one layer of at least one adhesive, so as to form said dual waterproofing membrane assembly system for a structure;
(e) wherein said first material is different than said second material;
(f) wherein said at least one first waterproof membrane, and said at least one second waterproof membrane forming a dual waterproofing layer extends along at least a portion of a wall; and
(g) wherein one of said at least one first waterproof membrane, and said at least one second waterproof membrane extends along at least a portion of a floor.

In another aspect this invention comprises a method of providing a dual waterproofing membrane assembly system for a structure, comprising the steps of:
(a) forming at least one soil retention system having a first face and a second face, and wherein said first face faces compacted earth or soil;
(b) securing at least one bentonite sheet waterproofing membrane layer membrane having a first face and a second face, to at least a portion of said at least one soil retention system, such that said first face of said at least one bentonite sheet waterproofing membrane layer is secured to at least a portion for said second face of said at least one soil retention system, and said at least one bentonite sheet waterproofing membrane layer is composed of a layer of a first material;
(c) securing a layer of a second material composed of at least one waterproof sheet membrane layer having a first face and a second face, and having at least one layer of at least one adhesive on said second face of said at least one waterproof sheet membrane layer, to at least a portion of said at least one bentonite sheet waterproofing membrane layer, such that said first face of said at least one waterproof sheet membrane layer is secured to at least a portion of said second face of said at least one bentonite sheet waterproofing membrane layer, so as to form said dual waterproofing membrane assembly system for a structure;
(d) wherein said first material is different than said second material;
(e) wherein said at least one first waterproof membrane, and said at least one second waterproof membrane forming a dual waterproofing layer extends along at least a portion of a wall; and
(f) wherein one of said at least one first waterproof membrane, and said at least one second waterproof membrane extends along at least a portion of a floor.

DETAILED DESCRIPTION

The inventive below grade, blind side, improved dual waterproofing membrane assembly incorporating at least one secondary membrane comprising of at least one bentonite sheet waterproofing layer, and at least one primary membrane comprising of at least one sheet membrane with at least one adhesive to fully bond to a concrete/shotcrete, and a method of making, and using same will now be discussed with reference to FIGS. 1 through 13. Although the scope of the present invention is much broader than any particular embodiment, a detailed description of the preferred embodiment follows together with drawings. These drawings are for illustration purposes only and are not drawn to scale. Like numbers represent like features and components in the drawings.

In summary the invention is a below grade, blind side, improved dual waterproofing membrane assembly incorporating at least one secondary membrane comprising of at least one bentonite sheet waterproofing layer, and at least one primary membrane comprising of at least one sheet membrane with at least one adhesive to fully bond to a concrete/shotcrete, and a method of making, and using same in building or wall construction, and placing it under and around a foundation of a building or dwelling or on its below grade blind side retaining walls, etc. It should be appreciated that the inventive waterproofing system comprises of two separate and independent waterproofing membranes or layers, and which are innovatively combined to create a single robust waterproofing layer or system.

Figure 1:
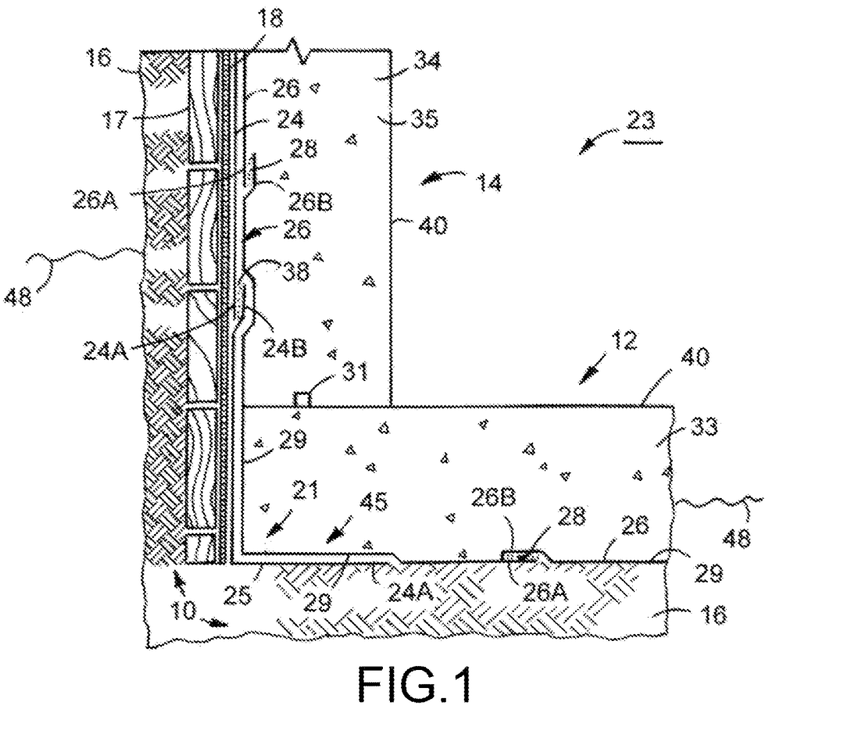
FIG. 1, illustrates a side cut-away view of the inventive below grade dual membrane waterproofing system for waterproofing according to a first embodiment of the invention.
Figure 5:
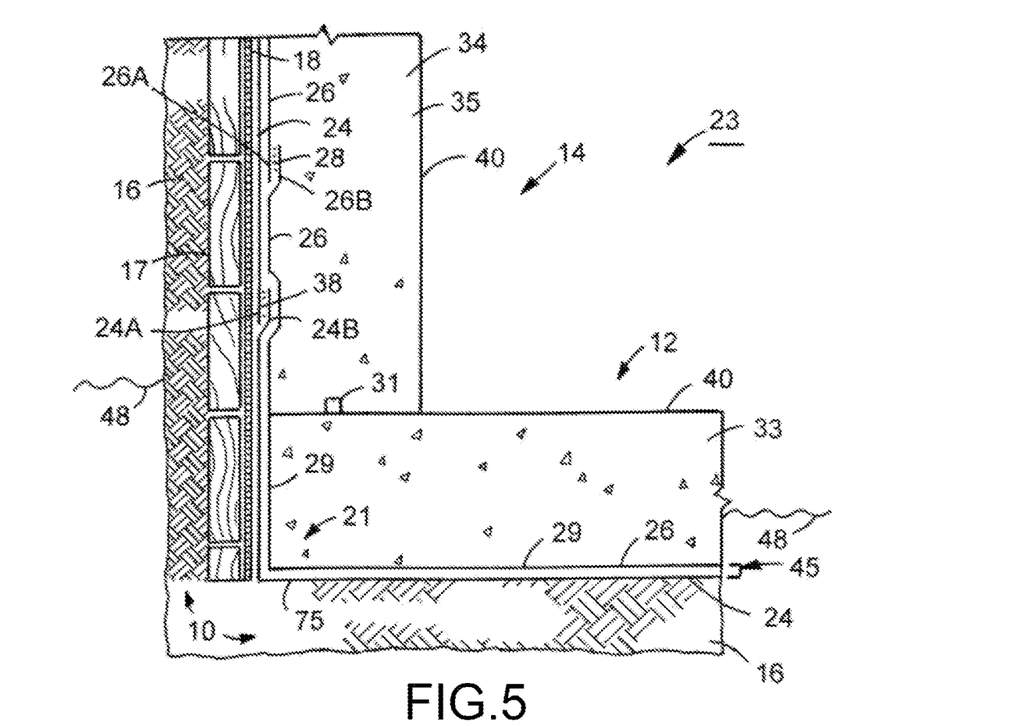
FIG. 5, illustrates a side cut-away view of the inventive below grade dual membrane waterproofing system for waterproofing according to a fifth embodiment of the invention.

FIG. 1, illustrates a side cut-away view of the inventive below grade dual membrane waterproofing system for waterproofing 23, according to a first embodiment of the invention. After an area 10, has been dug up or prepared for the foundation of a building 34, or a floor 12, or a wall 14, or a structure 34, it is recommended that the floor areas 12, be either compacted, to form a compacted earth 16, or that a mud slab 16, be installed, so as to create a substantially flat horizontal or floor surface 12. It is also recommended that similar steps are also taken for the preparation of a side wall 14, or a blind wall 14, or a similar other structure 34, where the earth around the area 10, is compacted so as to create compacted or retained earth 16, or a mud slab 16, creating a substantially flat vertical or wall surface 14. For some applications it is recommended that at least one layer of a retaining means 17, or a soil retention system 17, such as, for example, wood lagging 17, be installed along the exposed surface or face of the compacted or retained earth 16, or the mud slab 16. For a blind side wall 14, a soil retention system 17, could also be installed, such as, for example, using wood lagging 17, soil cement 17, etc. It should be appreciated that a soil retention system 17, helps in holding back the compacted earth or dirt 16, from coming down due to, for example, gravity. The soil retention system 17, also helps in creating a substantially uniform vertical surface for the wall 14. Optionally, for some applications, if needed, one could also place at least one drain board 18, (such as, for example, AVM Drain Board 6000), or at least one foam layer 18, or at least one polystyrene insulation board 18, along the exposed surface or face of the wood lagging 17. The next step is to apply or secure at least one layer of the inventive secondary waterproofing layer 24, or a first waterproofing layer or membrane 24, such as, a bentonite sheet waterproofing membrane or layer 24, such as, for example, Aussie Clay 24, which is also referred to as a secondary membrane or layer 24, against the open face or surface of the wall 14, or drain board 18, or foam layer 18, (if used) or over or against the compacted earth 16, or mud slab 16, or waist slab 16, or the soil retention system 17. The inventive bentonite sheet waterproofing membrane or layer 24, usually comes in sheets 24, or rolls 24, which are then hung onto the exposed wall surface 14, using at least one securing means 50, 60, such as, nails, screws, bolt, anchor, adhesive material, and combinations thereof, to name a few. The inventive bentonite sheet waterproofing layer 24, that is installed along the surface of the wall 14, may terminate at the wall-to-floor corner 21, or be returned or extend several inches along the floor 12, such as, for example, say about 12 inches along the floor 12, and creating at least one bentonite sheet waterproofing layer extension 25, or for some applications it could extend along the whole floor surface 12, creating at least one bentonite sheet waterproofing layer 75, as shown in FIG. 5. For some applications where there needs to be an overlap between a first edge 24A, of a first bentonite sheet waterproofing membrane 24, and a second or adjacent edge 24B, of a second or adjacent bentonite sheet waterproofing membrane 24, one could optionally apply at least one adhesive 38, such as, for example, a sealant 38, such as, for example, an Aussie Clay sealant 38, so as to secure the first edge 24A, of the first bentonite sheet waterproofing membrane layer 24, to the second or adjacent edge 24B, of the second or adjacent bentonite sheet waterproofing membrane layer 24. It should be appreciated the under normal condition one does not need to apply the at least one sealant or adhesive 38, when overlapping a first bentonite sheet waterproofing membrane 24, and a second or adjacent edge 24B, of a second or adjacent bentonite sheet waterproofing membrane 24, however, the user under some conditions has the option to apply at least one layer or patch of the at least one sealant or adhesive 38, along the overlapping edges 24A, 24B. It should be understood that a small portion of the first edge 24A, of the bentonite sheet waterproofing membrane 24, is overlapped along the second edge 24B, of the second bentonite sheet waterproofing membrane 24, so as to create an illusion of a continuous layer of the bentonite sheet waterproofing membrane 24, along the whole surface, be it the wall 14, or the floor 12, or a ceiling (not shown). The next step is to apply at least one primary waterproofing layer 26, or a second waterproofing membrane or layer 26, such as, at least one sheet membrane 26, having at least one adhesive layer 29, such as, for example, Aussie Skin 550, which is also referred to as the primary waterproofing membrane or layer 26, over the open or exposed face or surface of the secondary waterproofing membrane or layer 24, or the at least one bentonite sheet waterproofing membrane 24, 25, 75, such that, the at least one adhesive layer 29, is not in direct contact with at least a portion of the open or exposed face or surface of the bentonite sheet waterproofing layer 24, 25, 75, or in other words the at least one layer of adhesive 29, faces up or away from the bentonite sheet waterproofing membrane 24. The primary membrane 26, is a solid sheet membrane 26, and comes as a solid sheet 26, or a roll membrane 26, and has an at least one layer of at least one adhesive 29, which can be loosely laid over the exposed face or surface of the bentonite sheet waterproofing membrane 24, with the adhesive layer 29, facing up or away from the at least one bentonite sheet 24. For some applications one can also secure the primary layer or membrane 26, to the substructure 16, 17, and/or 18, and the bentonite sheet waterproofing membrane 24, using at least one securing means 50, 60, to secure the membrane 26, to the substructure 16, 17, and/or 18, and the bentonite sheet waterproofing membrane 24, where the at least one securing means 50, 60, could be selected from a group comprising, nails, screws, bolt, anchor, adhesive material, and combinations thereof, to name a few. In some areas, such as, on floors 12, both membranes, namely, at least one layer of the bentonite sheet waterproofing membrane 24, or the at least one layer of the secondary membrane or layer 24, and the at least one of the primary membrane or layer 26, may not need to be secured to the floor 12, at all and simply be laid on the ground or floor 12, and use gravity to hold both or one or more layers in place. Similarly, for areas where there needs to be an overlap between a first edge 26A, of a first sheet membrane 26, with adhesive 29, and a second or adjacent edge 26B, of a second or adjacent sheet membrane 26, with adhesive 29, one can use the pre-manufactured factory laps 28, or for example, one could use a double sided tape or adhesive tape 28, such as, for example, an Aussie Skin Double Sided tape 28, or some other sealant 28, or adhesive 28, so as to secure one first edge 26A, of the first sheet membrane 26, with adhesive 29, to a second or adjacent edge 26B, of the second or adjacent sheet membrane 26, with adhesive layer 29. The securing of the first edge 26A, of the first membrane layer 26, to the second or adjacent edge 26B, of the second or adjacent membrane layer 26, will create an illusion of a continuous membrane layer 26, along the surface 12, 14, such as, the floor 12, or wall 14, or a ceiling (not shown). The next step is to create a concrete barrier for the foundation of the structure 34, or wall 14, or building 34, such as, for example, a concrete or shotcrete slab 33, which would go onto the floor 12, and/or a concrete or shotcrete wall 35, which would be along the wall 14, or a ceiling (not shown). It should be appreciated that a concrete 33, 35 or shotcrete 33, 35, normally does not adhere to the primary waterproofing layer or membrane 26, and thus having the adhesive 29, over the primary waterproofing layer or membrane 26, acts as a seed to allow the concrete 33, 35, or shotcrete 33, 35, to adhere or be secured to the primary waterproofing layer or membrane 26. The concrete wall 35, or concrete floor 33, that is formed over the sheet membrane 26, with adhesive layer 29, is such that the exposed side of the concrete wall 14, 35, or floor 12, 33, forms the interior wall 40, or the exterior wall 40, or interior floor 40, or exterior floor 40, of the structure 34, or building 34. The concrete slab 33, 35, or barrier 33, 35, for the foundation of the structure 34, or floor 12, or wall 14, or building 34, is preferably a concrete or shotcrete slab or floor 33, and/or a concrete or shotcrete wall 35. The dual membrane waterproofing system 23, prevents the water 48, or moisture 48, or hydrostatic pressure 48, from penetrating into the concrete/shotcrete floor 33 or concrete/shotcrete wall 35, from around a water table 48, or moisture 48, or hydrostatic pressure 48, thus keeping the floor 12, or the wall 14, or ceiling (not shown) completely dry, even though the area 10, around the structure 34, has water 48, or moisture 48, or hydrostatic pressure 48. The dual membrane waterproofing system 23, comprises essentially of at least one secondary membrane 24, and at least one primary membrane 26, forming the dual membrane waterproofing system 45, and thus one has two separate waterproofing membranes 24, 25, 75, and 26, which allows for a waterproofing of the area or regions that needs waterproofing or moisture proofing. It should be appreciated that the combination of two separate and distinct waterproofing membranes 24, 25, 75, and 26, one of which is a sheet membrane 26, with adhesive 29, to fully bond to concrete/shotcrete 33, 35, form the inventive and innovative dual membrane waterproofing system 45. For some applications, one could also provide the floor 12, wall 14, joining location with at least one water-stop 31, (such as, for example, an Aussie swell water-stop). It should be appreciated that the at least one secondary membrane or layer 24, serves several purposes, such as, for example, it adds "burst resistance", it acts as a backing layer onto which one applies the at least one primary membrane or layer 26, and the bentonite granules 24A, within the secondary membrane layer 24, will expand when exposed to water creating a sealing or gasketing effect thus sealing any cracks, tears, gaps, etc., to name a few. It should also be appreciated that the second or primary membrane layer 26, such as, for example, Aussie Skin 550 26, serves several purposes, such as, for example, it provides "burst resistance", and wherein the first or secondary membrane layer 24, namely, the bentonite sheet waterproofing membrane or layer 24, acts as a backing or a cushion or a supplemental "burst resistance" layer to the primary membrane 26, and further adds burst resistance to prevent the primary membrane 24, from rupturing during shotcrete or concrete 33, 35, applications. As stated earlier that the inventive waterproofing system 23, comprises of two separate and independent waterproofing membranes, namely, the first waterproofing layer or membrane 24, and the second waterproofing membrane or layer 26, and which are innovatively combined to create a single robust dual waterproofing layer or system 45. It should also be appreciated that the material used to make the first waterproofing layer or membrane 24, is different than the material used to make the second waterproofing membrane or layer 26.

Figure 2:
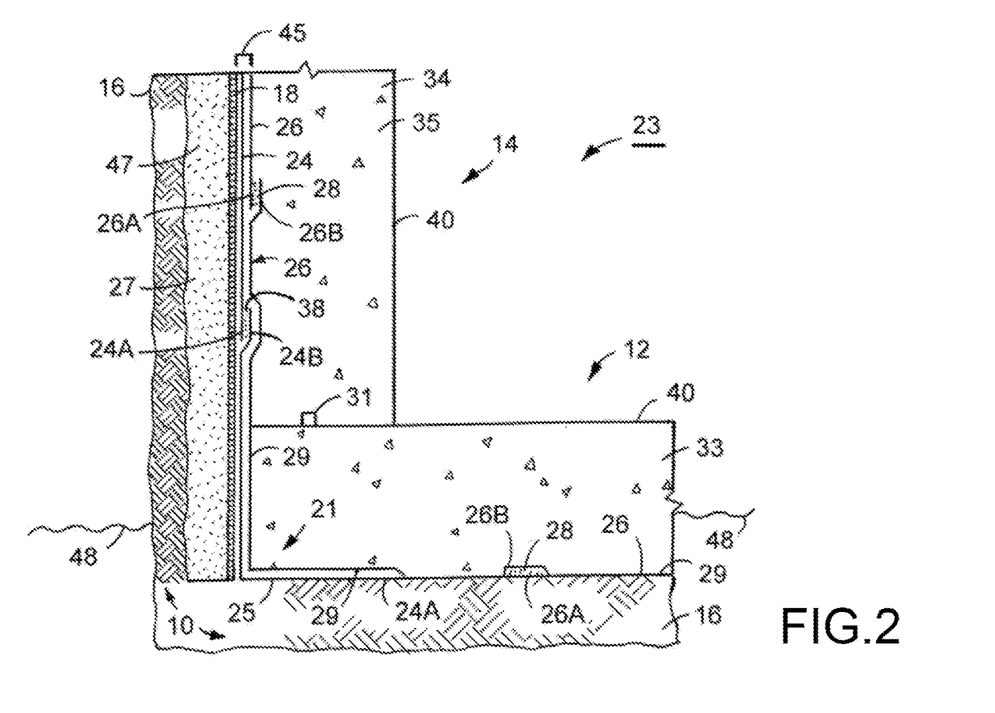
FIG. 2, illustrates a side cut-away view of the inventive below grade dual membrane waterproofing system for waterproofing according to a second embodiment of the invention.

FIG. 2, illustrates an enlarged side cut-away view of the inventive below grade dual membrane waterproofing system for waterproofing 23, according to a second embodiment of the invention. The structure of FIG. 2, is similar to the structure of FIG. 1, except that a concrete or a shotcrete retaining wall 27, has been installed instead of a wood lagging 17, between the retained earth 16, and the optional insulation board 18, or the drain board 18, and the inventive secondary bentonite sheet waterproofing membrane 24. For some applications the concrete or a shotcrete retaining wall 27, could contain at least one metal wire mesh 47, which is embedded within the shotcrete/concrete 33, 35. The concrete or a shotcrete retaining wall 27, can also be reinforced, using at least one reinforcing means 47, such as, for example, steel rods, steel mesh, rebar, fibers, wire mesh, and combinations thereof, to name a few.

Figure 3:
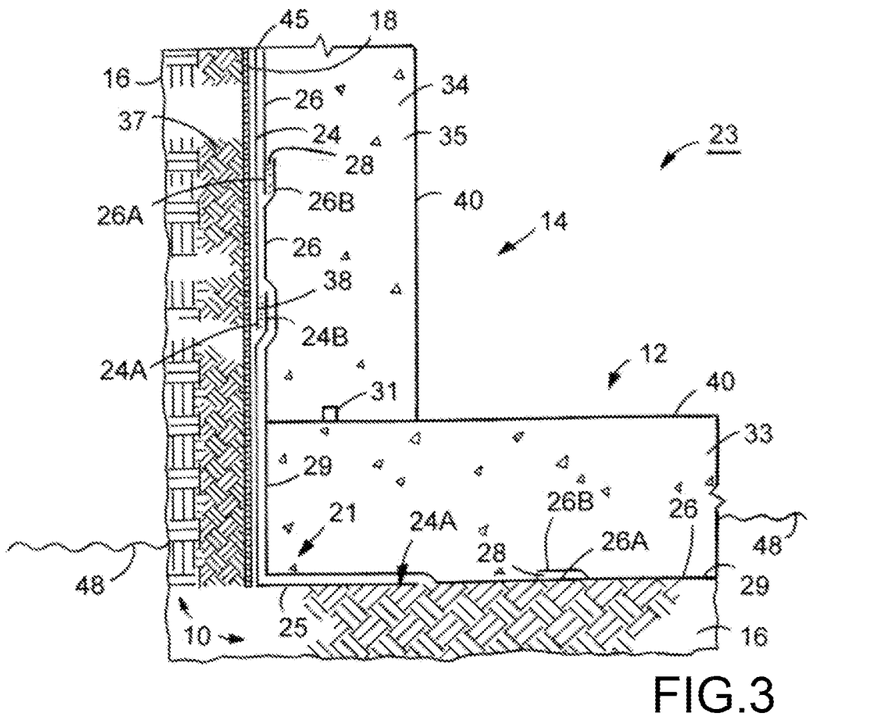
FIG. 3, illustrates a side cut-away view of the inventive below grade dual membrane waterproofing system for waterproofing according to a third embodiment of the invention.

FIG. 3, illustrates an enlarged side cut-away view of the inventive below grade dual membrane waterproofing system for waterproofing 23, according to a third embodiment of the invention. The structure of FIG. 3, is similar to the structure of FIG. 1, except that another soil retention system 37, is being shown instead of a wood lagging 17, between the retained earth 16, and the optional insulation board 18, or the drain board 18, and the inventive bentonite sheet waterproofing membrane 24. The another soil retention system 37, could be any of the other typical soil retention systems 37, such as, for example, lagging retention systems, soil/cement retention systems, shotcrete retention systems, concrete retention systems, using shotcrete or concrete to create thin temporary walls retention systems, plywood retention systems, pylons retention systems, caissons retention systems, sheet-metal piles retention systems, diaphragm wall retention systems, and combinations thereof, to name a few. For some applications, such as, for example, a blind side wall 14, a soil retention system 37, may be needed to be installed, such as, for example, using wood lagging 37, a soil cement 37, a metal wire mesh embedded in concrete 37, to name a few. It should be appreciated that a soil retention system 37, helps in holding back the compacted earth or dirt 16, from coming down due to, for example, gravity. The soil retention system 37, also helps in creating a substantially uniform vertical wall surface 14.

Figure 4:
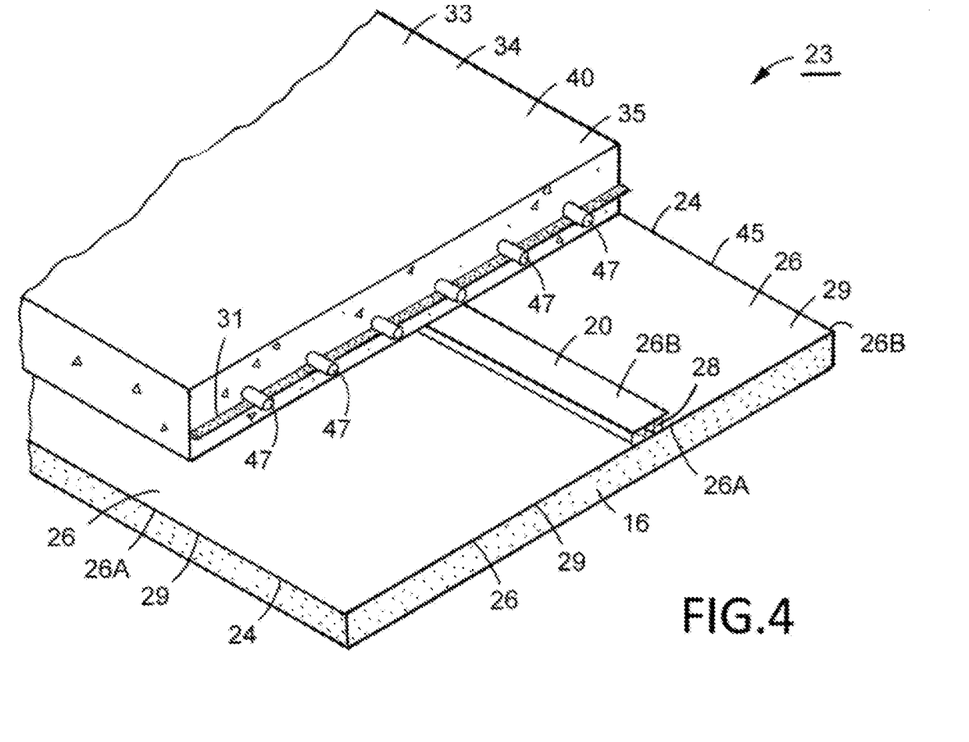
FIG. 4, illustrates a side cut-away view of the inventive below grade dual membrane waterproofing system for waterproofing according to a fourth embodiment of the invention.

FIG. 4, illustrates an enlarged side cut-away view of the inventive below grade dual membrane waterproofing system for waterproofing 23, according to a fourth embodiment of the invention. After the earth 16, has been compacted or a mud slab 16, has been formed, at least one layer of a bentonite sheet waterproofing membrane 24, is secured to or laid on the open face of the compacted earth 16, or the mud slab 16. At least one layer of the primary sheet membrane 26, having at least one layer of adhesive 29, is then laid over the bentonite sheet waterproofing membrane 24, with the at least one layer of adhesive 29, facing up or away from the secondary bentonite sheet waterproofing membrane 24. A concrete slab 33, 35, or a reinforced concrete slab 33, 35, is then poured onto the exposed surface or face of the sheet membrane 26, with at least one adhesive layer 29, and where the at least one adhesive layer 29, adheres to the concrete or shotcrete 33, 35. The concrete slab 33, 35, can be reinforced, using at least one reinforcing means 47, such as, for example, steel rods, steel mesh, rebar, fibers, wire mesh, and combinations thereof, to name a few. The concrete slab 33, 35, could also be provided with at least one water-stop 31, such as, for example, an Aussie swell water-stop 31. Optionally, for areas where there needs to be an overlap between a first edge 24A, of a first bentonite sheet waterproofing membrane layer 24, and a second or adjacent edge 24B, of a second or adjacent bentonite sheet waterproofing membrane layer 24, one can use the factory lap 38, or one can also optionally apply at least one securing means 20, such as, for example, a staple 20, a fastener 20, an adhesive 20, a sealant 20, and combinations thereof, to name a few, so as to secure one first edge 24A, of the first bentonite sheet waterproofing membrane layer 24, to the second or adjacent edge 24B, of the second or adjacent bentonite sheet waterproofing membrane layer 24. It should be appreciated that in order to create a continuous primary membrane or layer 26, or an overlap between two adjacent primary membranes or layers 26, one could secure one first edge 26A, of the first primary membrane or layer 26, to the second or adjacent edge 26B, of the second or adjacent primary membrane or layer 26, using a factory lap (with a built-in adhesive 28, in the lap), or a at least one double-sided tape 28, and combinations thereof, to name a few.

FIG. 5, illustrates an enlarged side cut-away view of the inventive below grade dual membrane waterproofing system for waterproofing 23, according to a fifth embodiment of the invention. This is similar to FIG. 1, except that the secondary bentonite sheet waterproofing membrane 24, is extended over the entire under-slab floor area 12, forming at least one secondary bentonite sheet waterproofing membrane layer 75, instead of just on the walls 14, or along a portion of the corner 21, and forming the bentonite sheet waterproofing layer extension 25, such as, for example, extending only say about 12 inches or so along the floor surface 12. As stated earlier at least one layer of at least one sheet membrane 26, having at least one adhesive layer 29, such as, for example, Aussie Skin 550, which is also referred to as the primary membrane or layer 26, can then be applied over the open or exposed face or surface of the at least one secondary bentonite sheet waterproofing membrane 24, 25, 75, with the adhesive layer 29, facing up or away from the at least one secondary layer or membrane 24, 25, 75. The next step is to create a concrete barrier for the foundation of the structure 34, or floor 12, or wall 14, or building 34, such as, for example, a concrete or shotcrete slab 33, which would go onto the floor 12, and/or a concrete or shotcrete wall 35, which would be along the wall 14, or a concrete or shotcrete layer which would be along a ceiling (not shown), and which would be applied to the open or exposed face or surface of the primary membrane or layer 26, or the side having the at least one layer of an adhesive 29. The concrete wall 35, or concrete floor 33, that is formed over the sheet membrane 26, with adhesive layer 29, is such that the concrete wall 35, or the concrete floor 33, is in contact with the adhesive layer 29, and the exposed side of the concrete floor 12, 33, or the wall 14, 35, or the ceiling, forms the interior wall 40, or the exterior wall 40, or interior floor 40, or exterior floor 40, of the structure 34, or building 34.

Figure 6:
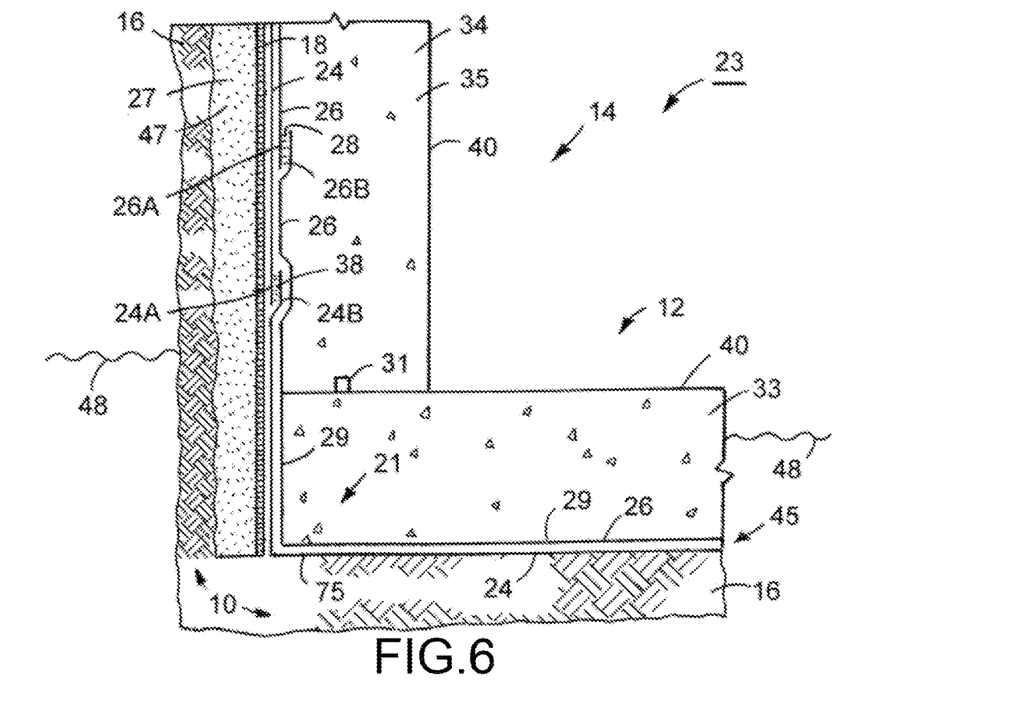
FIG. 6, illustrates a side cut-away view of the inventive below grade dual membrane waterproofing system for waterproofing according to a sixth embodiment of the invention.

FIG. 6, illustrates an enlarged side cut-away view of the inventive below grade dual membrane waterproofing system for waterproofing 23, according to a sixth embodiment of the invention. This is similar to FIG. 2, except that the secondary bentonite sheet waterproofing membrane 24, is extended over the entire under-slab floor area 12, forming at least one secondary bentonite sheet waterproofing membrane layer 75, instead of just on the walls 14, or along a portion of the corner 21, and forming the bentonite sheet waterproofing layer extension 25, such as, for example, extending only say about 12 inches or so along the floor surface 12. As stated earlier at least one layer of at least one sheet membrane 26, having at least one adhesive layer 29, such as, for example, Aussie Skin 550, which is also referred to as the primary membrane or layer 26, can then be applied over the open or exposed face or surface of the at least one secondary bentonite sheet waterproofing membrane 24, 25, 75, with the adhesive layer 29, facing up or away from the at least one secondary layer or membrane 24, 25, 75. The next step is to create a concrete barrier for the foundation of the structure 34, or floor 12, or wall 14, or building 34, such as, for example, a concrete or shotcrete slab 33, which would go onto the floor 12, and/or a concrete or shotcrete wall 35, which would be along the wall 14, or a concrete or shotcrete layer which would be along a ceiling (not shown), and which would be applied to the open or exposed face or surface of the primary membrane or layer 26, or the side having the at least one layer of adhesive 29. The concrete wall 35, or concrete floor 33, that is formed over the sheet membrane 26, with adhesive layer 29, is such that concrete wall 35, or the concrete floor 33, is in contact with adhesive 29, and the exposed side of the concrete floor 12, 33, or the wall 14, 35, or the ceiling, forms the interior wall 40, or the exterior wall 40, or interior floor 40, or exterior floor 40, of the structure 34, or building 34.

Figure 7:
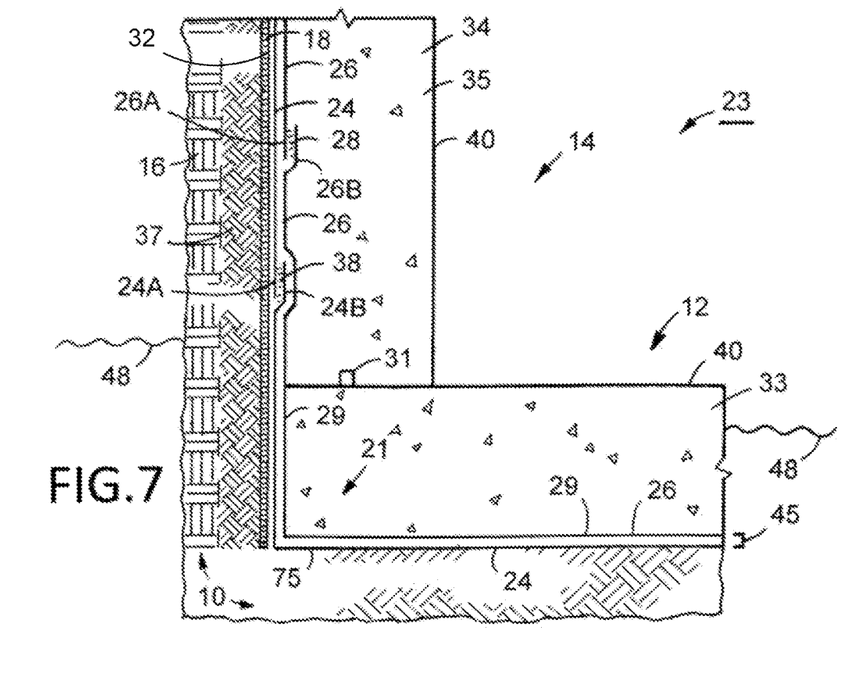
FIG. 7, illustrates a side cut-away view of the inventive below grade dual membrane waterproofing system for waterproofing according to a seventh embodiment of the invention.

FIG. 7, illustrates an enlarged side cut-away view of the inventive below grade dual membrane waterproofing system for waterproofing 23, according to a seventh embodiment of the invention. This is similar to FIG. 3, except that the secondary bentonite sheet waterproofing membrane 24, is extended over the entire under-slab floor area 12, forming at least one secondary bentonite sheet waterproofing membrane layer 75, instead of just on the walls 14, or along a portion of the corner 21, and forming the bentonite sheet waterproofing layer extension 25, such as, for example, extending only say about 12 inches or so along the floor surface 12. As stated earlier at least one layer of at least one sheet membrane 26, having at least one adhesive layer 29, such as, for example, Aussie Skin 550, which is also referred to as the primary membrane or layer 26, can then be applied over the open or exposed face or surface of the at least one secondary bentonite sheet waterproofing membrane 24, 25, 75, with the adhesive layer 29, facing up or away from the at least one secondary layer or membrane 24, 25, 75. The next step is to create a concrete barrier for the foundation of the structure 34, or floor 12, or wall 14, or building 34, such as, for example, a concrete or shotcrete slab 33, which would go onto the floor 12, and/or a concrete or shotcrete wall 35, which would be along the wall 14, or a concrete or shotcrete layer which would be along a ceiling (not shown), and which would be applied to the open or exposed face or surface of the primary membrane or layer 26, or the side having the adhesive 29. The concrete wall 35, or concrete floor 33, that is formed over the sheet membrane 26, with adhesive layer 29, is such that the concrete wall 35, or the concrete floor 33, is in contact with the adhesive 29, and the exposed side of the concrete floor 12, 33, or the wall 14, 35, or the ceiling, forms the interior wall 40, or the exterior wall 40, or interior floor 40, or exterior floor 40, of the structure 34, or building 34. It should be appreciated that for some applications at least one vapor barrier layer or liner 32, or at least one polymer layer or liner 32, or a plastic liner 32, could be directly hung onto the exposed face of the surface, such as, the exposed face of the compacted earth 16, or the mud slab 16, or the soil retention system 37, or the retaining means 17, or the drain board 18, etc., and one could then directly secure or place the at least one bentonite sheet waterproofing membrane layer 24, against the exposed face of the at least one vapor barrier liner 32, or the at least one polymer liner 32. For some applications the at least one vapor barrier layer or liner 32, could be between about 5 mils to about 12 mils.

Figure 8A:
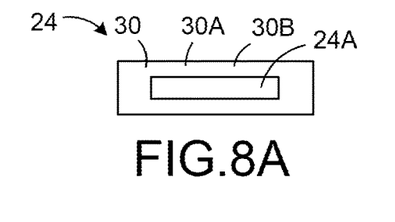
FIG. 8A, illustrates a side cut-away view of the inventive bentonite sheet waterproofing membrane or layer contained inside at least one layer of at least one fabric material.

FIG. 8A, illustrates a side cut-away view of the inventive bentonite sheet waterproofing membrane or layer 24, showing bentonite particles 24A, being contained inside at least one fabric material 30. For some applications the bentonite particles 24A, could be contained at least one first layer of at least one first fabric material 30A, and at least one second layer of at least one second fabric material 30B. The inventive bentonite sheet waterproofing membrane or layer 24, or Aussie Clay 24, basically comprises of bentonite granular particles 24A, which are contained inside the at least one fabric material 30. Thus, it should be appreciated that the at least one secondary inventive bentonite sheet waterproofing membrane layer 24, having bentonite granules 24A, are contained inside a pouch 30, or a pillow 30, or a layer 30, so as to form the at least one secondary inventive bentonite sheet waterproofing membrane layer 24. For some applications the inventive bentonite membrane 24, is simply a layer of bentonite granules 24A, that are between two layers of two fabric materials 30A, 30B, such as, for example, a geotextile fabric 30A, 30B. In essence the inventive bentonite sheet waterproofing membrane or layer 24, comprises of at least three (3) layers, namely, at least one first fabric layer 30A, at least one layer of bentonite granules 24A, and at least one second layer of fabric material 30B, and thus, the at least one fabric layers 30A, 30B, completely envelopes the at least one layer of bentonite granules 24A, as clearly shown in FIG. 8. It should be appreciated that the fabric material 30A, 30B, should be breathable, or made of a material 30A, 30B, that allows the passage of water 48, to penetrate inside the pouch 30, and directly interact with the at least one layer of bentonite granular particles 24A, which bentonite granular particles 24A, then retain or contain the water 48, so as to form the inventive bentonite sheet waterproofing membrane or layer 24. It should be appreciated that the bentonite particles 24A, are typically granular in nature, and thus these bentonite particles 24A, need a breathable support carrier 30, so as to allow for the passage of water 48, but prevent the falling out of the bentonite particles 24A, from the inventive bentonite sheet waterproofing membrane or layer 24.

Figure 8B:
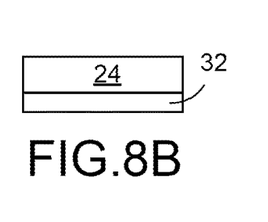
FIG. 8B, illustrates a side cut-away view of the inventive bentonite sheet waterproofing membrane or layer, illustrated in FIG. 8A, and having at least one layer of at least one vapor barrier.

FIG. 8B, illustrates a side cut-away view of the inventive bentonite sheet waterproofing membrane or layer 24, illustrated in FIG. 8A, and having at least one layer of at least one vapor barrier 32. The at least one vapor barrier 32, could be selected from a group comprising a plastic material, a polymer material, a poly-liner material, a polyethylene material, a composite material, and combinations thereof, to name a few. It should be appreciated that the at least one vapor barrier 32, could be secured to at least one side of the inventive bentonite sheet waterproofing membrane or layer 24, or it could be loosely adhered to at least one side of the inventive bentonite sheet waterproofing membrane or layer 24. For some applications the at least one vapor barrier 32, could be between about 5 mils to about 12 mils. It should be appreciated that during installation the at least one vapor barrier 32, faces the compacted earth 16, or the mud slab 16, and is not on the face or side where the user (not shown) would be placing the at least one sheet membrane 26, having the at least one adhesive layer 29, such as, for example, Aussie Skin 550.

Figure 9:
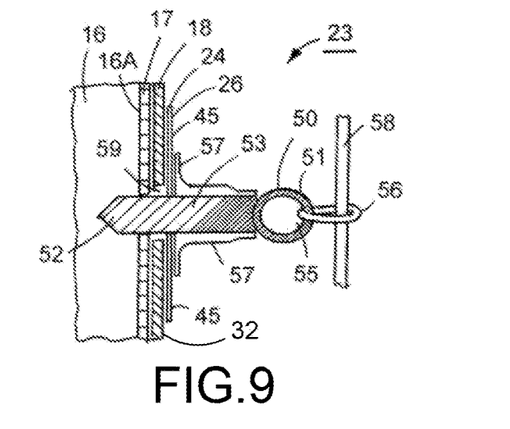
FIG. 9, illustrates a side cut-away view of the inventive below grade dual membrane waterproofing system for waterproofing illustrating an exemplary securing means to secure the inventive dual waterproofing membrane assembly to a structure according to an eighth embodiment of the invention.

FIG. 9, illustrates a side cut-away view of the inventive below grade dual membrane waterproofing system for waterproofing 23, illustrating an exemplary securing means 50, to secure the inventive dual waterproofing membrane assembly 45, to a structure according to an eighth embodiment of the invention. FIG. 9, illustrates the use of the securing means 50, before the application of concrete 33, 35, or shotcrete 33, 35. For some applications one has to secure the substructure, such as, for example, the drain board 18, or foam board 18, the secondary layer or membrane 24, the primary layer or membrane 26, and/or a rebar cage 58, to either the earth or mud slab 16, and/or the soil retention system 17, and for such securing one could use at least one securing means or device 50, such as, for example, a screw 50, an anchor 50, a nail 50, an adhesive 50, a bolt 50, and combinations thereof, to name a few. The securing means 50, typically has a head 51, a tail end 52, and a shaft 53. For some applications the head 51, could have at least one opening or eyelet 55. After the shaft 53, of the securing means 50, has penetrated the various layers 16, 17, 18, 24, 26, and the tail end 52, has been anchored to the earth or mud slab 16, and/or the soil retention system 17, one would then use at least one sealant 57, around the opening 59, created by the penetration of the shaft 53, through the various layers 16, 17, 18, 24, 26, so as to create a moisture or fluid barrier layer 57. For some applications one could also place the at least one sealant 57, on or around the shaft 53, of the at least one securing means or device 50. Therefore, once the rebar cage 58, has been properly secured one can then apply at least one layer of concrete 33, 35, or shotcrete 33, 35, to the exposed face or surface of the layer 26, or the side or surface having the at least one layer of adhesive 29. It should be appreciated that for most applications the securing means 50, usually gets buried in the at least one layer of concrete 33, 35, or shotcrete 33, 35. For some applications a securing means 56, such as, a tie 56, a string 56, to name a few, can be used the secure the rebar cage 58, to the securing means 50, such as, by securing the securing means 56, using the eyelet 55, or the head 51, to secure the rebar cage 58, to the substructure 16, 17, 18, 24, 26, via the at least one securing means 50. It is preferred that the at least one sealant 57, is made from a material that has a long life, and does not disintegrate, such as, in a water or moisture or hydrostatic pressure environment 48. Similarly, it is preferred that the at least one securing means 50, is made from a material that is non-rusting, and that the securing means 50, has a long life, and does not disintegrate, such as, in a water or moisture or hydrostatic pressure environment 48. It is preferred that the earth 16, or mud slab 16, has a substantially planer surface 16A, so that any structure that is built over or along the earth 16, or mud slab 16, has a substantially planar surface which would correspond to the planar surface 16A. The planar surface 16A, also helps eliminate any voids or distortions that might creep in due to the uneven surface of the earth 16, or mud slab 16.

Figure 10:
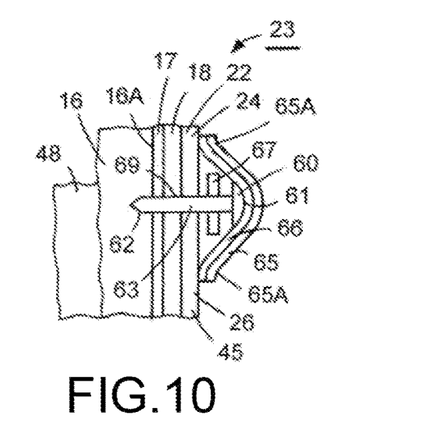
FIG. 10, illustrates a side cut-away view of the inventive below grade dual membrane waterproofing system for waterproofing illustrating another exemplary securing means to secure the inventive dual waterproofing membrane assembly to a structure according to an ninth embodiment of the invention.

FIG. 10, illustrates a side cut-away view of the inventive below grade dual membrane waterproofing system for waterproofing 23, illustrating another exemplary securing means 60, to secure the inventive dual waterproofing membrane assembly 45, to a structure according to a ninth embodiment of the invention. FIG. 10, illustrates the use of the securing means 60, before the application of concrete 33, 35, or shotcrete 33, 35. For some applications one has to secure the substructure, such as, for example, the drain board 18, the secondary layer or membrane 24, and the primary layer or membrane 26, or the dual membrane 45, to either the earth or mud slab 16, and/or the soil retention system 17, or each to the other, and for such securing one could use at least one securing means 60, or device 60, such as, for example, a screw 60, an anchor 60, a nail 60, an adhesive 60, a bolt 60, and combinations thereof, to name a few. The securing means 60, typically has a head 61, a tail end 62, and a shaft 63. After the shaft 63, of the securing means 60, has penetrated the various layers 16, 17, 18, 24, 26, and the tail end 62, has been anchored to the earth or mud slab 16, and/or the soil retention system 17, one would then use at least one optional sealant 67, or a washer 67, or a grommet 67, or an O-Ring 67, around the opening 69, created by the penetration of the shaft 63, through the various layers 16, 17, 18, 24, 26, so as to create a moisture or fluid barrier layer at a location opposite of the earth or mud slab 16, and near the head 61, of the securing means 60. For some applications the at least one sealant 67, or a washer 67, or a grommet 67, or an O-Ring 67, can be placed on or around the shaft 63, of the securing means 60, or device 60, and then the head 61, could be pushed towards the earth or mud slab 16, so that the at least one sealant 67, substantially covers the opening 69, which has been created by the penetration of the shaft 63, and that the at least one optional sealant 67, is tightly sandwiched between the head 61, and the adjacent surface layer 16, 17, 18, 24, 26. For some applications one could also place at least one patch 65, having peripheral edges 65A, such as, an Aussie skin patch 65, using at least one securing means 66, such as, for example, an adhesive 66, a double-sided tape 66, a sealant 66, and combinations thereof, to name a few, to provide an additional layer of protection from any fluid 48, or hydrostatic pressure 48, that might penetrate into the structure via the opening 69. It should be understood that the peripheral edges 65A, of the patch 65, gets adhered and secured to the exposed face of the substructure 24, 26, via the securing means 66. Therefore, once the securing device 60, has secured the substructure 16, 17, 18, 24, 26, one can then apply at least one layer of concrete 33, 35, or shotcrete 33, 35, to the exposed face or surface of the primary layer or membrane 26, or the side or surface having the at least one layer of adhesive 29. It should be appreciated that for most applications the securing means 60, gets buried in the at least one layer of concrete 33, 35, or shotcrete 33, 35. It is preferred that the at least one optional sealant 67, is made from a material that has a long life, and does not disintegrate, such as, in a water or moisture or hydrostatic pressure environment 48. Similarly, it is preferred that the at least one securing means 60, is made from a material that is non-rusting, and that the securing means 60, has a long life, and does not disintegrate, such as, in a water or moisture or hydrostatic pressure environment 48.

Figure 11:
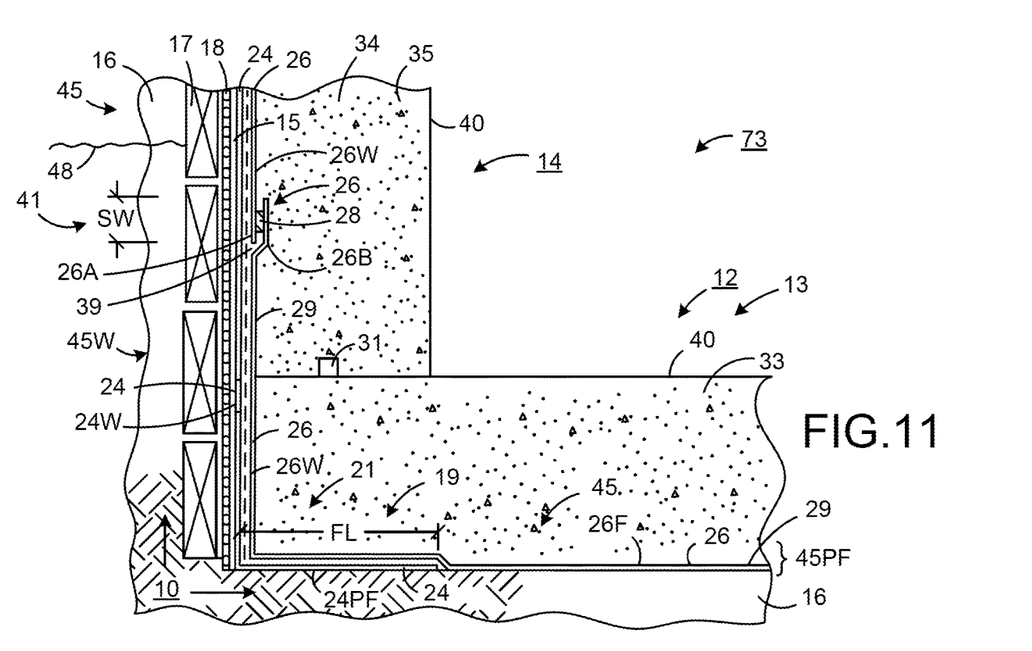
FIG. 11, illustrates a side cut-away view of the inventive below grade dual membrane waterproofing system for waterproofing according to a tenth embodiment of the invention.

FIG. 11, illustrates a side cut-away view of the inventive below grade dual membrane waterproofing system for waterproofing 73, according to an eleventh embodiment of the invention. FIG. 11, is similar to FIG. 1, except that the dual inventive layer assembly 45, fully extends along the wall surface 14, creating a dual inventive wall layer assembly 45W, and it partially extends along the floor surface 12, or floor area 13, creating a dual inventive floor partial layer assembly 45PF, and the combination of 45W, and 45PF, is used as a water or moisture protection layer 45, or as a waterproofing layer 45, against the water table 48, or hydrostatic pressure 48. Furthermore, FIG. 11, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive floor layer assembly 45PF, comprises of at least one layer of the membrane 24, or at least one partial layer of a floor membrane 24PF, that partially extends along the floor 12, and at least one skin layer 26, or at least one layer of a floor skin layer 26F, that fully extends along the floor 12. It is preferred that the at least one partial layer of the floor membrane 24PF, that partially extends along the floor 12, extends along the floor 12, or floor area 13, to at least a distance 19, or floor length FL. For most applications the distance 19, could be from about 6 inches, or about 12 inches, or at least a sufficient distance that it provides sufficient waterproofing capability to the dual inventive floor layer assembly 45PF. For most applications it is preferred that the dual inventive wall layer assembly 45W, transitions into the dual inventive floor layer assembly 45PF, at or around the corner 21, without a seam, such as, seam 39. For some applications it is preferred that the seam 39, has a seam width 41, or seam width SW, and wherein the seam width 41, is sufficiently wide to provide a waterproof seam 39. It is preferred for most applications that the seam width 41, is at least, say about 3 inches or more, or as desired by the user, or as needed for the application. Even though seam 39, provides a complete waterproof seam or joint 39, but in reality, it does provide a weak spot, as it is done by hand by workers, and not some precise calibrated equipment or machine. It should be appreciated that the seam 39, is only shown for the at least one skin layer 26, but in reality, the at least one layer of the membrane 24, also has seam 39, but for the ease of understanding it is not being shown. However, it should be understood that the seam 39, for the at least one layer of the membrane 24, is similar to the seam 39, for the at least one skin layer 26, and uses the same materials, and processes to create the seam 39, for the at least one layer of the membrane 24. Furthermore, it should be understood that for some applications as shown in FIG. 11, the inventive dual layer 45, comprising of the inventive wall portion dual layer 45W, and the inventive floor portion dual layer 45F, extends along at least a portion of the wall 14, and along at least a portion of the floor surface 12, 13. However, as shown in FIG. 11, the inventive floor portion dual layer 45PF, has the at least one layer of the floor skin layer 26F, extending along the entire surface of the floor 12, 13, while the at least one layer of the floor membrane 24PF, extends along only a portion of the floor 12, or floor area 13.

Figure 12:
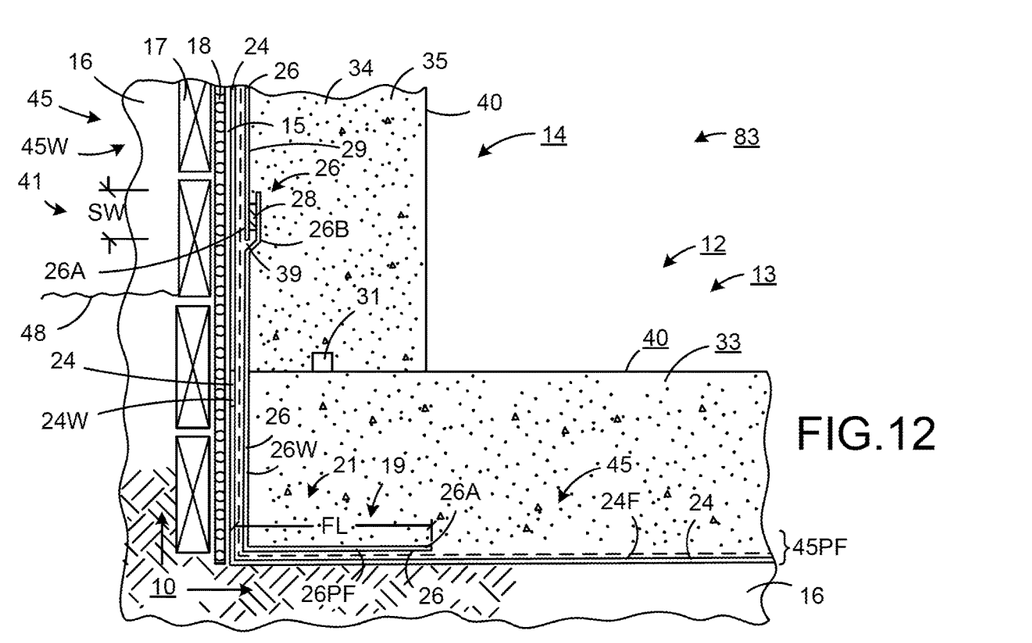
FIG. 12, illustrates a side cut-away view of the inventive below grade dual membrane waterproofing system for waterproofing according to an eleventh embodiment of the invention.

FIG. 12, illustrates a side cut-away view of the inventive below grade dual membrane waterproofing system for waterproofing 83, according to a twelfth embodiment of the invention. FIG. 12, is similar to FIG. 1, except that the dual inventive layer assembly 45, fully extends along the wall surface 14, creating a dual inventive wall layer assembly 45W, and it partially extends along the floor surface 12, or floor area 13, creating a dual inventive floor partial layer assembly 45PF, and the combination of 45W, and 45PF, is used as a water or moisture protection layer 45, or as a waterproofing layer 45, against the water table 48, or hydrostatic pressure 48. Furthermore, FIG. 12, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive partial floor layer assembly 45PF, comprises of at least one layer of the membrane 24, or at least one layer of a floor membrane 24F, that extends along the floor 12, 13, and at least one skin layer 26, or at least one partial floor skin layer 26PF, that partially extends along the floor 12, 13. It is preferred that the at least one partial floor skin layer 26PF, that partially extends along the floor 12, 13, extends along the floor 12, or floor area 13, to at least a distance 19, or floor length FL. For most applications, the distance 19, could be from about 6 inches, or about 12 inches, or at least a sufficient distance that it provides sufficient waterproofing capability to the dual inventive partial floor layer assembly 45PF. For most applications it is preferred that the dual inventive wall layer assembly 45W, transitions into the dual inventive floor layer assembly 45PF, at or around the corner 21, without a seam, such as, seam 39. For some applications it is preferred that the seam 39, has a seam width 41, or seam width SW, and wherein the seam width 41, is sufficiently wide to provide a waterproof seam 39. It is preferred for most applications that the seam width 41, is at least, say about 3 inches or more, or as desired by the user, or as needed for the application. Even though seam 39, provides a complete waterproof seam or joint 39, but in reality, it does provide a weak spot, as it is done by hand by workers, and not some precise calibrated equipment or machine. It should be appreciated that the seam 39, is only shown for the at least one skin layer 26, but in reality, the at least one layer of the membrane 24, also has seam 39, but for the ease of understanding it is not being shown. However, it should be understood that the seam 39, for the at least one layer of the membrane 24, is similar to the seam 39, for the at least one skin layer 26, and uses the same materials, and processes to create the seam 39, for the at least one layer of the membrane 24. Furthermore, it should be understood that for some applications as shown in FIG. 12, the inventive dual layer 45, comprising of the inventive wall portion dual layer 45W, and the inventive floor portion dual layer 45F, extends along at least a portion of the wall 14, and along at least a portion of the floor surface 12, or floor area 13. However, as shown in FIG. 12, the inventive floor portion dual layer 45PF, has the at least one layer of the floor skin layer 26PF, extending along only a portion of the floor 12, 13, while the at least one layer of the floor membrane 24F, extends along the entire surface of the floor 12, or floor area 13.

Figure 13:
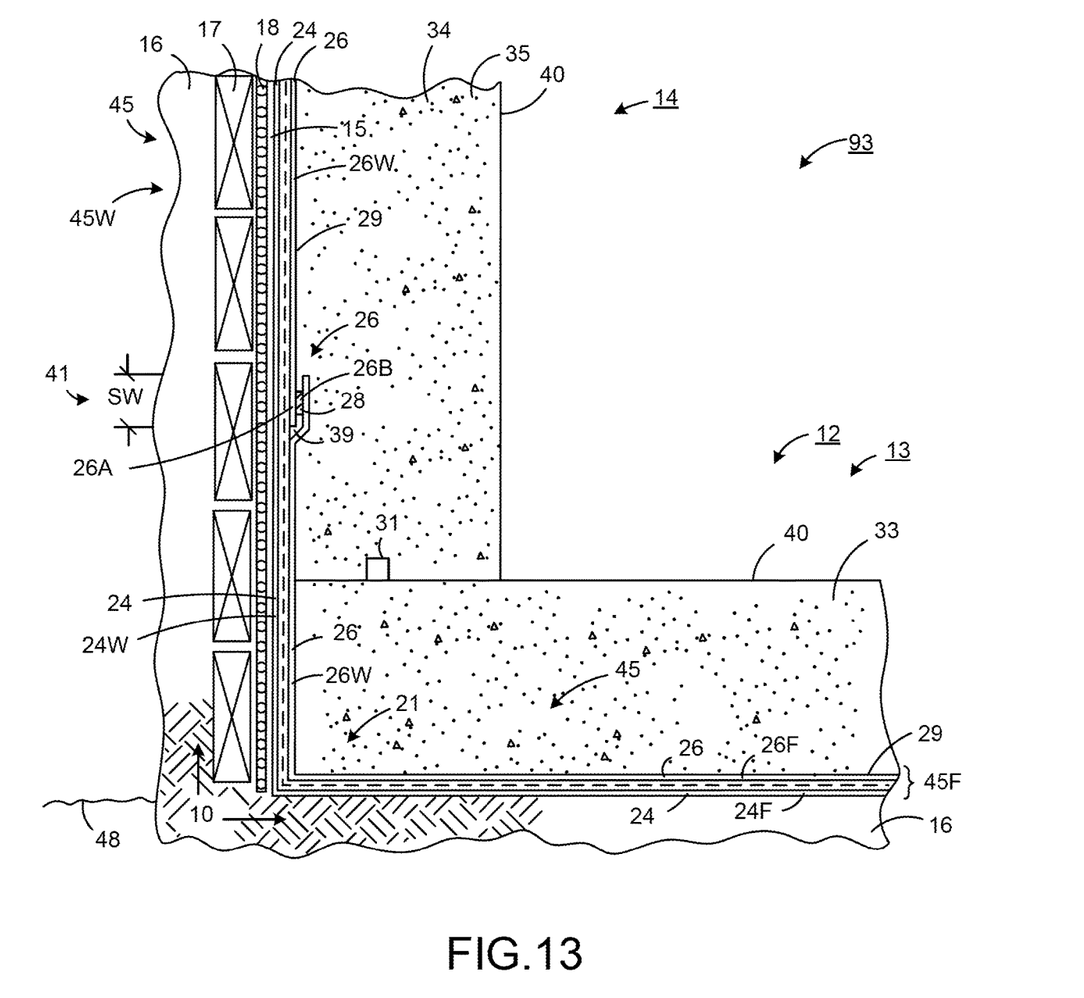
FIG. 13, illustrates a side cut-away view of the inventive below grade dual membrane waterproofing system for waterproofing according to a twelfth embodiment of the invention.

FIG. 13, illustrates a side cut-away view of the inventive below grade dual membrane waterproofing system for waterproofing 93, according to a thirteenth embodiment of the invention. FIG. 13, is similar to FIG. 1, except that the dual inventive layer assembly 45, fully extends along the wall surface 14, creating a dual inventive wall layer assembly 45W, and it also fully extends along the floor surface 12, or floor area 13, creating a dual inventive floor layer assembly 45F, and the combination of 45W, and 45F, is used as a water or moisture protection layer 45, or as a waterproofing layer 45, against the water table 48, or hydrostatic pressure 48. Furthermore, FIG. 13, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive floor layer assembly 45F, comprises of at least one layer of the membrane 24, or at least one layer of a floor membrane 24F, that extends along the floor 12, or floor area 13, and at least one skin layer 26, or at least one layer of a floor skin layer 26F, that extends along the floor 12, 13. For most applications it is preferred that the dual inventive wall layer assembly 45W, transitions into the dual inventive wall layer assembly 45F, at or around the corner 21, without a seam, such as, seam 39. For some applications it is preferred that the seam 39, has a seam width 41, or seam width SW, and wherein the seam width 41, is sufficiently wide to provide a waterproof seam 39. It is preferred for most applications that the seam width 41, is at least, say about 3 inches or more, or as desired by the user, or as needed for the application. Even though seam 39, provides a complete waterproof seam or joint 39, but in reality, it does provide a weak spot, as it is done by hand by workers, and not some precise calibrated equipment or machine. It should be appreciated that the seam 39, is only shown for the at least one skin layer 26, but in reality, the at least one layer of the membrane 24, also has seam 39, but for the ease of understanding it is not being shown. However, it should be understood that the seam 39, for the at least one layer of the membrane 24, is similar to the seam 39, for the at least one skin layer 26, and uses the same materials, and processes to create the seam 39, for the at least one layer of the membrane 24. Furthermore, it should be understood that FIG. 13, clearly shows that the inventive dual layer 45, comprising of the inventive wall portion dual layer 45W, and the inventive floor portion dual layer 45F, extends along the complete wall 14, and along the complete or entire floor surface 12, or floor area 13.

It should be appreciated that the inventive dual membrane 45, comprises of at least one secondary bentonite sheet waterproofing membrane layer 24, which is secured by at least one primary sheet membrane 26, with adhesive 29, such as, for example, Aussie Skin 550.

The at least one primary membrane 26, or skin 26, (such as, Aussie Skin 550), is a heavy-duty sheet membrane 26, with adhesive 29, to fully bond to concrete/shotcrete 33, 35, however, it can be any sheet membrane 26, with adhesive 29, to fully bond to concrete/shotcrete 33, and having any thickness. It is preferred that the primary membrane 26, with adhesive 29, to fully bond to concrete/shotcrete 33, 35, should be easy to install, should be a puncture resistant sheet waterproofing membrane 26, and having an excellent adhesion between the primary membrane 26, and a wet concrete 33, 35, or shotcrete 33, 35.

Shotcrete 33, 35, or sprayed concrete 33, 35, is concrete 33, 35, or mortar 33, 35, conveyed through a hose (not shown) and pneumatically projected at high velocity onto a surface 12, 14, as a construction technique. For some applications the sprayed concrete 33, 35, or shotcrete 33, 35, is typically reinforced by conventional securing means 47, such as, for example, steel rods 47, steel mesh 47, fibers 47, and combinations thereof, or, for example, a rebar cage 58. Shotcrete 33, 35, can be placed, and compacted at the same time, due to the force with the nozzle, and it can be sprayed onto any type or shape of surface 12, 14, including vertical surface 14, horizontal surface 12, or overhead areas (not shown), such as, along a roof or ceiling, which is done in a similar manner as the application along the horizontal floor 12, or a vertical wall 14, and would be well known to a person skilled in the art.

The secondary or inventive bentonite sheet waterproofing membrane or layer 24, the Bentonite Mass per Unit Area, other specifications, along with the appropriate protection, and drainage, will depend on the particular application, and one can get this information, from the provider of the waterproofing system, (such as, for example, the Aussie Clay technical drawings and documentation), as these criteria or specification will depend on the soil type for the earth 16, the condition of the area 10, the water or moisture table 48, and the specifications of the building or structure 34.

It should be appreciated that the inventive secondary layer 24, or the bentonite layer or membrane 24, expands when wet, absorbing as much as several times its dry mass in water, thus the expansion of the inventive secondary layer 24, or the bentonite layer 24, is now being used as a sealant in a wet soil condition, and to protect a structure 34, or to create a very effective water barrier layer 24, or a waterproofing layer 24. For the purposes of specification what is relevant is the amount of bentonite in the secondary membrane 24, and is calculated as Bentonite Mass per Unit Area. So, for example, for some applications one could have 1.0 pound of bentonite per sqft., while for another application one could use, for example, 0.8 pound of bentonite per sqft. It is preferred that the range of Bentonite Mass per Unit Area is between about 0.5 pound of bentonite per sqft. to about 2.0 pound of bentonite per sqft., and preferably about 1.0 pound of bentonite per sqft.

It is preferred that all securing means 50, 60, such as, for example, anchors 50, 60, nails 50, 60, screws 50, 60, etc., that are used to hang the dual waterproofing membrane 45, below the water table 48, be non-rusting or rust-proof securing means 50, 60. It is also preferred that all screws 50, 60, (FIGS. 9, and 10), used to hang the primary sheet membrane 26, are preferably sealed with, for example, a 3 inch×3 inch patch of material 26, 65, (such as, for example, Aussie Skin) 26, bonded with, for example, a double-sided tape 28, 66, (such as, for example, Aussie tape) 28, as the patch of material 26, 65, or Aussie Skin Sanded Tape 28, would provide the waterproofing qualities.

For some applications, one could also provide an additional sealing layer 65, over the head 61, using a securing material 38, such as, for example, bentonite clay sealant 38, such as, for example, Aussie Clay Sealant 38, to seal the nails 60, or screws 60, over the bentonite sheet waterproofing membrane layer 24, or use, for example, say a 3 inch by 3 inch patch of sheet membrane 26, with adhesive 29, such as, for example, an Aussie Skin 550 patch, Aussie Skin Sanded Tape or sealant 26, 29, such as, Aussie Seal M, to name a few.

For some applications, such as, below the water table 48, a drain board 18, may be substituted with an approved protection layer 18, as long as the approved protection layer 18, is providing sufficient protection for the dual membrane system 45, installed on the building or structure 34.

As stated earlier that this invention 23, can be used, such as, for example, especially in a high-risk conditions, where, for example, the building 34, or floor 12, or wall 14, or structure 12, 14, 34, is going to be built in a water table 48, area 10, and/or exposed to periodic or on-going hydrostatic pressure 48. One of the innovations of this invention 23, is that it includes, at least one layer of secondary membrane 24, such as, for example, the inventive bentonite sheet waterproofing membrane or layer 24, such as, for example, Aussie Clay 24. After the inventive bentonite sheet waterproofing membrane or layer 24, such as, for example, Aussie Clay 24, has been installed, then the at least one layer of the primary membrane 26, or skin layer 26, such as, for example, Aussie Skin membrane 26, is installed over the exposed face or surface of the inventive secondary bentonite sheet waterproofing membrane layer 24, or Aussie Clay 24, or secondary membrane 24.

The primary or high-density polyethylene (HDPE) sheet skin membrane 26, (such as, for example, Aussie Skin 550), having different thicknesses, depending on the job requirements, and ranging, for example, from about 0.5 mm to about 3.5 mm thick, is secured to the exposed face or surface of the inventive secondary or bentonite sheet waterproofing membrane or layer 24, using the at least one securing mechanism 50, 60, to form the dual membrane assembly 45. It should be appreciated that the primary layer or membrane 26, is usually secured to the secondary layer or membrane 24, using at least one mechanical fastening means 50, 60, especially, when both layers 45, are being installed in a vertical position 14, or along a ceiling (not shown), but could be laid loose when applied on a surface 12, such as, a floor 12, and then gravity would keep both layers 24, 26, 45, in their respective positions along the floor 12, without the need of any mechanical securing.

For areas where at least one primary sheet membrane 26, with adhesive 29, is being joined to another primary sheet membrane 26, with adhesive 29, such as, along an edge 26A, 26B, or a seam, it is preferred that the edge or seam area 26A, 26B, that are going to be overlapped have clean surfaces. Before bonding the next sheet membrane 26, to an existing or already applied sheet membrane 26, one should remove the release film(s) (not shown) from the factory laps of the sheet membrane 26, which release film(s) is used to protect the adhesive layer 29. It is preferred the next or second sheet membrane 26, be installed and mated with the previous or already installed sheet membrane 26, and has, for example, a minimum of say, between about 2.0 inches to about 6.0 inches overlap along the edges 26A, 26B. For some applications it is preferred that a steel or rubber roller, is rolled or passed over the overlap or the seam joint area 26A, 26B, several times while applying pressure to ensure proper adhesion between the first edge 26A, of the first sheet membrane 26, and the second or adjacent edge 26B, of the second or adjacent sheet membrane 26, that is being joined, each to the other, at their respective edges 26A, 26B. For some applications, such as, for example, during cold or wet weather where one skin layer or sheet 26, for some reason is not adhering to the second skin layer or sheet 26, one could optionally, and gently use a heat gun, or a welder (such as, a Liester welder), which will help improve the adhesion between the two overlapping skin layers 26, at the seam or along the overlap area or edges 26A, 26B.

It should be understood that the inventive dual system 45, comprises of at least one secondary layer of a bentonite sheet waterproofing membrane 24, and at least one primary sheet membrane 26, with at least one adhesive layer 29. This inventive dual system 45, may also include at least one bentonite sheet waterproofing membrane 24, and wherein the at least one bentonite sheet waterproofing membrane 24, is completely contained inside or enveloped by at least one layer 30A, of at least one fabric material 30B, as more clearly shown in FIG. 8.

The at least one layer of the secondary bentonite sheet waterproofing membrane layer 24, preferably has a thickness from say between about 20 mils, to about 500 mils.

The at least one primary sheet or membrane 26, with at least one adhesive 29, such as, for example, an Aussie Skin 550, is very thick, such as, for example, about 1.2 mm thick. The at least one layer of the at least one sheet membrane 26, with adhesive 29, such as, for example, the Aussie Skin 550, preferably has a thickness from say between about 20 mils, to about 350 mils. For some applications one could also use a high-density polyethylene (HDPE) sheet membrane 26, such as, for example, Aussie Skin, having different thicknesses, depending on the job requirements, and ranging, for example, from about 0.5 mm to about 3.5 mm thick, that can be secured to the exposed face of the at least one bentonite sheet waterproofing membrane layer 24.

For some applications the at least one soil retention system 17, could be selected from a group comprising of a drain board, a foam, a compacted earth layer, a metallic structure, a wooden structure, a plastic structure, a plastic liner, a composite structure, and combinations thereof, to name a few. For some applications one could also use at least one vapor barrier liner 32, and wherein the at least one vapor barrier liner 32, could be loosely secured to at least one side of the at least one bentonite sheet waterproofing membrane layer 24, as shown in FIG. 8B. For some applications one could also use at least one polymer liner 32, and wherein the at least one polymer liner 32, could be secured to one of the first face and the second face of the at least one bentonite sheet waterproofing membrane layer 24, and wherein the at least one polymer liner 32, could have a thickness of between about 5 mils, and about 12 mils.

For some applications one could also have at least one liner having a first face and a second face, and wherein this at least one liner could be placed between the at least one soil retention system 17, and the at least one first waterproof membrane 24, such that at least a portion of the first face of the at least one liner is secured to at least a portion of the second face of the at least one soil retention system, and at least a portion of the second face of the at least one liner could be secured to at least a portion of the first face of the at least one first waterproof membrane 24. The at least one liner could be selected from a group comprising of a plastic liner, a polyolefin liner, a fabric liner, a single fabric liner, a dual fabric liner, a high-density polyethylene (HDPE) liner, a polyethylene high-density (PEHD) liner, a polyethylene thermoplastic liner, and combinations thereof, to name a few.

The present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A dual waterproofing membrane assembly system for a structure, comprising:
   (a) at least one soil retention system having a first face and a second face, and wherein said first face faces compacted earth or soil;
   (b) at least one bentonite sheet waterproofing membrane layer having a first face and a second face, and wherein at least a portion of said first face of said at least one bentonite sheet waterproofing membrane layer is secured to at least a portion of said second face of said at least one soil retention system, and said at least one bentonite sheet waterproofing membrane layer is composed of a layer of a first material;
   (c) at least one waterproof sheet membrane layer having a first face and a second face, said at least one waterproof sheet membrane layer is composed of a layer of a second material, and wherein said second face of said at least one waterproof sheet membrane layer has at least one layer of at least one adhesive, and wherein at least a portion of said first face of said at least one waterproof sheet membrane layer is secured to at least a portion of said second face of said at least one bentonite sheet waterproofing membrane layer, so as to form said dual waterproofing membrane assembly system for a structure;
   (d) wherein said first material is different than said second material;
   (e) wherein one of said at least one bentonite sheet waterproofing membrane, and said at least one waterproof sheet membrane layer extends along at least a portion of a vertical surface; and
   (f) wherein one of said at least one bentonite sheet waterproofing membrane, and said at least one waterproof sheet membrane layer extends along at least a portion of a horizontal surface.

2. The dual waterproofing membrane assembly system for a structure of claim 1, wherein said structure is selected from a group consisting of a wall, a floor, a foundation, a blind wall, an interior wall, an exterior wall, a foundation slab, a ceiling, and combinations thereof.

3. The dual waterproofing membrane assembly system for a structure of claim 1, wherein said at least one soil retention system is selected from a group consisting of a drain board, a foam, a compacted earth layer, a metallic structure, a wooden structure, a plastic structure, a plastic liner, a composite structure, and combinations thereof.

4. The dual waterproofing membrane assembly system for a structure of claim 1, wherein at least one vapor barrier liner is loosely secured to at least one side of said at least one bentonite sheet waterproofing membrane layer.

5. The dual waterproofing membrane assembly system for a structure of claim 1, wherein a first edge of said at least one waterproof sheet membrane layer is attached to a second edge of at least one second waterproof sheet membrane layer.

6. The dual waterproofing membrane assembly system for a structure of claim 1, wherein a first edge of said at least one bentonite sheet waterproofing membrane layer is attached to a second edge of at least one second bentonite sheet waterproofing membrane layer.

7. The dual waterproofing membrane assembly system for a structure of claim 1, wherein at least one layer of concrete or shotcrete having a first face and a second face is applied, such that at least a portion of said first face of said at least one layer of concrete or shotcrete is secured to at least a portion of said at least one layer of at least one adhesive.

8. The dual waterproofing membrane assembly system for a structure of claim 1, wherein the thickness of said at least one waterproof sheet membrane layer is between about 0.5 mm to about 3.5 mm.

9. The dual waterproofing membrane assembly system for a structure of claim 1, wherein said at least one bentonite sheet waterproofing membrane layer has a range of bentonite mass per unit area of between about 0.5 pound of bentonite per sqft. to about 2.0 pound of bentonite per sqft.

10. The dual waterproofing membrane assembly system for a structure of claim 1, wherein at least one securing means is used to secure one of said at least one bentonite sheet waterproofing membrane layer and said at least one waterproof sheet membrane layer to at least a portion of said at least one soil retention system.

11. The dual waterproofing membrane assembly system for a structure of claim 1, wherein at least one securing means is used to secure one of said at least one bentonite sheet waterproofing membrane layer and said at least one waterproof sheet membrane layer to at least a portion of said at least one soil retention system, and wherein said at least one securing means is selected from a group consisting of an anchor, a screw, a nail, an adhesive, a bolt, and combinations thereof.

12. The dual waterproofing membrane assembly system for a structure of claim 1, wherein said at least one soil retention system, is selected from a group consisting of a lagging retention system, a soil retention system, a cement retention system, a shotcrete retention system, a concrete retention system, a shotcrete thin temporary wall retention system, a concrete thin temporary walls retention system, a plywood retention systems, and a pylon retention system, and combinations thereof.

13. The dual waterproofing membrane assembly system for a structure of claim 1, wherein at least one vapor barrier liner is secured to one of said first face and said second face of said at least one bentonite sheet waterproofing membrane layer.

14. The dual waterproofing membrane assembly system for a structure of claim 1, wherein at least one vapor barrier liner is secured to one of said first face and said second face of said at least one bentonite sheet waterproofing membrane layer, and wherein said at least one vapor barrier liner has a thickness of between about 5 mils, and about 12 mils.

15. The dual waterproofing membrane assembly system for a structure of claim 1, wherein said at least one bentonite sheet waterproofing membrane layer comprises of at least one layer of bentonite granules which are enveloped inside at least one layer of at least one fabric material.

16. The dual waterproofing membrane assembly system for a structure of claim 1, wherein bentonite in said at least one bentonite sheet waterproofing membrane layer expands upon contact with water.

17. The dual waterproofing membrane assembly system for a structure of claim 1, wherein at least one liner having a first face and a second face, is placed between said at least one soil retention system and said at least one bentonite sheet waterproofing membrane, such that at least a portion of said first face of said at least one liner is secured to at least a portion of said second face of said at least one soil retention system, and at least a portion of said second face of said at least one liner is secured to at least a portion of said first face of said at least one bentonite sheet waterproofing membrane.

18. The dual waterproofing membrane assembly system for a structure of claim 17, wherein said at least one liner is selected from a group consisting of a plastic liner, a polyolefin liner, a fabric liner, a single fabric liner, a dual fabric liner, a high-density polyethylene (HDPE) liner, a polyethylene high-density (PEHD) liner, a polyethylene thermoplastic liner, and combinations thereof.

19. A dual waterproofing membrane assembly system for a structure, comprising:
  (a) at least one soil retention system having a first face and a second face, and wherein said first face faces compacted earth or soil;
  (b) at least one bentonite sheet waterproofing membrane layer having a first face and a second face, and wherein at least a portion of said first face of said at least one bentonite sheet waterproofing membrane layer is secured to at least a portion of said second face of said at least one soil retention system, and said at least one bentonite sheet waterproofing membrane layer is composed of a layer of a first material;
  (c) at least one waterproof sheet membrane layer having a first face and a second face, said at least one waterproof sheet membrane layer is composed of a layer of a second material, and wherein said second face of said at least one waterproof sheet membrane layer has at least one layer of at least one adhesive, and wherein at least a portion of said first face of said at least one waterproof sheet membrane layer is secured to at least a portion of said second face of said at least one bentonite sheet waterproofing membrane layer;
  (d) at least one layer of concrete or shotcrete having a first face and a second face, and wherein at least a portion of said first face of said at least one layer of concrete or shotcrete is secured to at least a portion of said at least one layer of at least one adhesive, so as to form said dual waterproofing membrane assembly system for a structure;
  (e) wherein said first material is different than said second material;
  (f) wherein one of said at least one bentonite sheet waterproofing membrane, and said at least one waterproof sheet membrane layer extends along at least a portion of a vertical surface; and
  (g) wherein one of said at least one bentonite sheet waterproofing membrane, and said at least one waterproof sheet membrane layer extends along at least a portion of a horizontal surface.

20. A method of providing a dual waterproofing membrane assembly system for a structure, comprising the steps of:
  (a) forming at least one soil retention system having a first face and a second face, and wherein said first face faces compacted earth or soil;
  (b) securing at least one bentonite sheet waterproofing membrane layer membrane having a first face and a second face, to at least a portion of said at least one soil retention system, such that said first face of said at least one bentonite sheet waterproofing membrane layer is secured to at least a portion for said second face of said at least one soil retention system, and said at least one bentonite sheet waterproofing membrane layer is composed of a layer of a first material;
  (c) securing a layer of a second material composed of at least one waterproof sheet membrane layer having a first face and a second face, and having at least one layer of at least one adhesive on said second face of said at least one waterproof sheet membrane layer, to at least a portion of said at least one bentonite sheet waterproofing membrane layer, such that said first face of said at least one waterproof sheet membrane layer is secured to at least a portion of said second face of said at least one bentonite sheet waterproofing membrane layer, so as to form said dual waterproofing membrane assembly system for a structure;
  (d) wherein said first material is different than said second material;
  (e) wherein one of said at least one bentonite sheet waterproofing membrane, and said at least one waterproof sheet membrane layer extends along at least a portion of a vertical surface; and
  (f) wherein one of said at least one bentonite sheet waterproofing membrane, and said at least one waterproof sheet membrane layer extends along at least a portion of a horizontal surface.

\* \* \* \* \*